(12) United States Patent
Rao et al.

(10) Patent No.: US 6,206,965 B1
(45) Date of Patent: Mar. 27, 2001

(54) APPARATUS FOR COATING A DECORATIVE WORKPIECE

(76) Inventors: Angelo Rao, 220 Thomson Creek Blvd., Woodbridge, Ontario (CA), L4H 1H1; Oscar Chiarotto, 32 Taylorwood Avenue East, Bolton, Ontario (CA), L7E 1J5; Vittorino Nonis, 91 Rowntree Mill Road, Weston, Ontario (CA), M9L 1C4

( * ) Notice: Subject to any disclaimer, the term of this patent is extended or adjusted under 35 U.S.C. 154(b) by 0 days.

(21) Appl. No.: 09/137,593

(22) Filed: Aug. 21, 1998

Related U.S. Application Data

(63) Continuation-in-part of application No. 08/942,587, filed on Oct. 2, 1997, now Pat. No. 5,951,805.

(51) Int. Cl.[7] ....................................................... B05C 5/02
(52) U.S. Cl. ........................ 118/410; 118/423; 118/424; 118/427; 118/428; 156/578
(58) Field of Search .................................. 118/249, 256, 118/410, 502, 423, 424, 427, 428; 156/578; 425/112, 122, 127, 403.1

(56) References Cited

U.S. PATENT DOCUMENTS

| | | |
|---|---|---|
| 138,767 | 5/1873 | Shepard . |
| 3,142,371 | 7/1964 | Rice et al. . |
| 3,693,675 | 9/1972 | Allen . |
| 4,220,115 | 9/1980 | Brossman et al. . |
| 4,488,917 | 12/1984 | Porter et al. . |
| 5,209,809 | 5/1993 | Walter et al. . |
| 5,326,592 | 7/1994 | Goewey et al. . |
| 5,443,643 * | 8/1995 | Cardini et al. ........................ 118/712 |
| 5,514,417 | 5/1996 | Matthews et al. . |
| 5,672,391 | 9/1997 | Santarossa . |

FOREIGN PATENT DOCUMENTS

| | | |
|---|---|---|
| 2184205 | 3/1997 | (CA) . |
| 2804326 | 8/1979 | (DE) . |
| 3932573 | 4/1991 | (DE) . |
| WO9631330 | 10/1996 | (WO) . |
| WO9825745 | 6/1998 | (WO) . |

\* cited by examiner

*Primary Examiner*—Laura Edwards
(74) *Attorney, Agent, or Firm*—Young & Basile, P.C.

(57) ABSTRACT

A method and apparatus is provided for applying a plaster-like coating material to the decorative exposed surface of a preform workpiece. The apparatus comprises; means for mechanically advancing a workpiece along the apparatus along a straight horizontal axis over a non-continuous surface; means for engaging the bottom portion of a workpiece to constrain lateral and vertical movement as the workpiece passes along the apparatus; and means for applying a desired thickness of plaster-like coating material to a decorative surface of an advancing workpiece. Both the method and apparatus provide on a consistent basis, a smooth coating with a controlled thickness tightly bonded to the entire exposed decorative surface of a workpiece. The method and apparatus provide a simple, efficient, cost effective and reliable means for applying a plaster-like coating to the exposed decorative surface of a workpiece for use on a commercial scale in the construction industry.

29 Claims, 13 Drawing Sheets

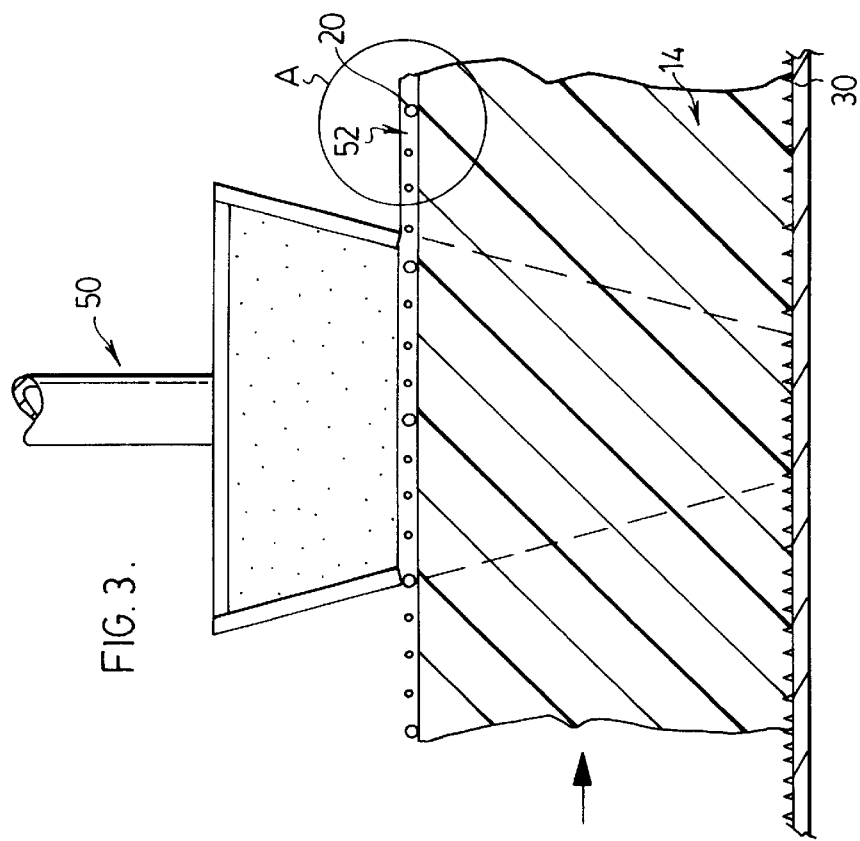
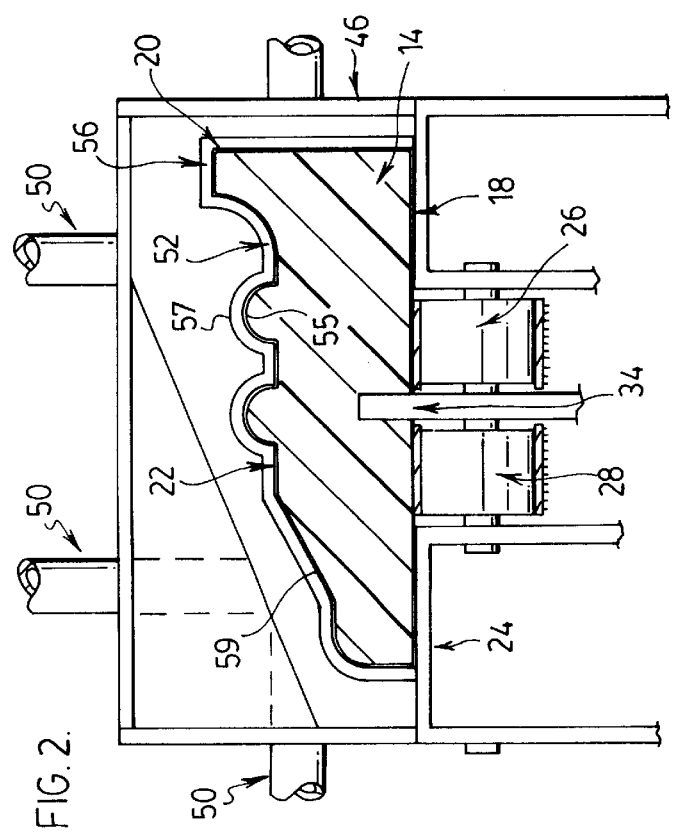
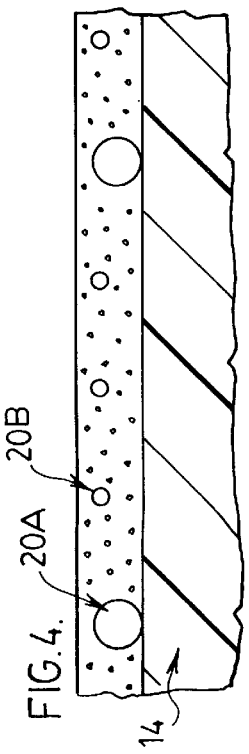

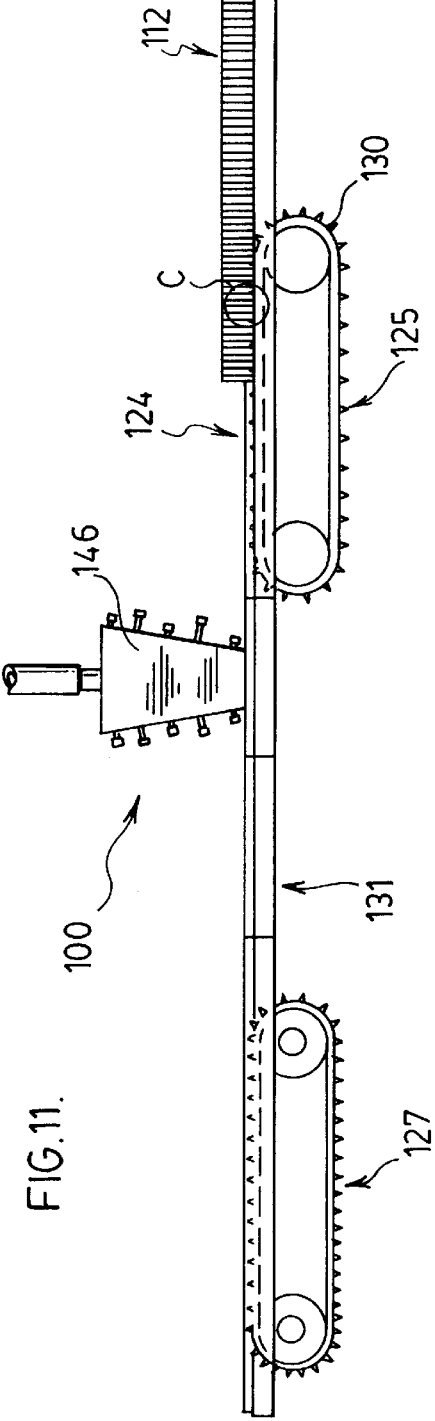
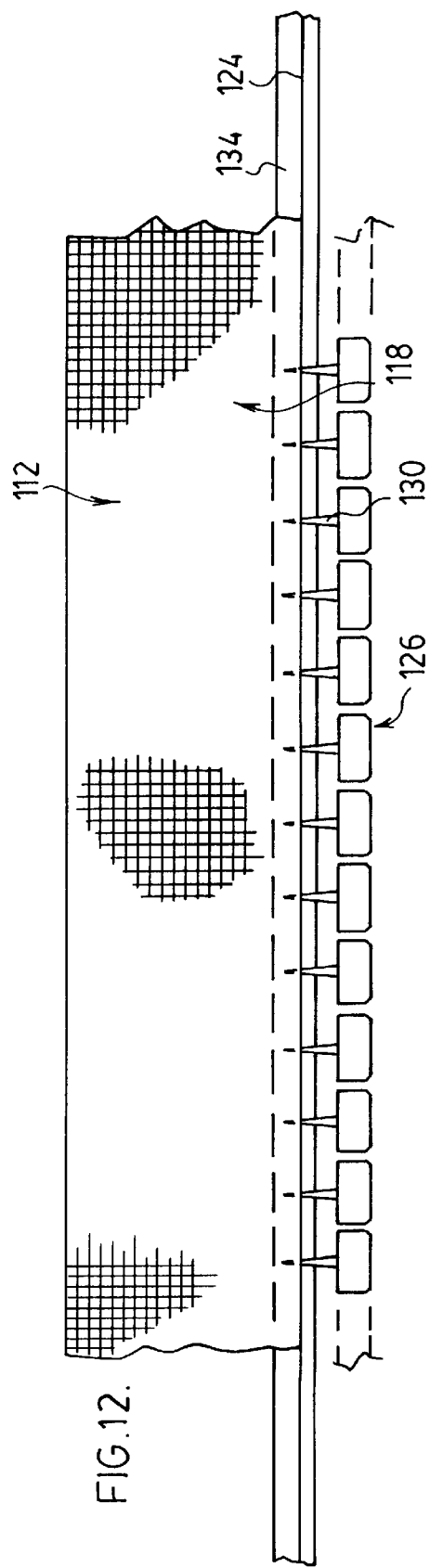

APPARATUS FOR COATING A DECORATIVE WORKPIECE

RELATED APPLICATIONS

This application is a Continuation-In-Part of U.S. application Ser. No. 08/942,587 filed Oct. 2, 1997 now U.S. Pat. No. 5,951,805.

FIELD OF THE INVENTION

This invention relates to decorative mouldings and more particularly to a method and apparatus for coating preformed workpieces having decorative surfaces.

BACKGROUND OF THE INVENTION

Preformed workpieces such as decorative mouldings are widely used in the construction industry. Such mouldings are designed to be mounted against exterior or interior walls for providing architectural features on building structures in sectors such as residential, industrial, commercial and institutional buildings. The exposed surface of the moulding is usually decorative and as such, has an irregular surface in crosssection and continuous in the longitudinal direction. Mouldings can be fabricated from several materials including wood, plaster and expanded polystyrene (EPS). EPS mouldings are particularly attractive to use because of their relatively light weight and ease of fabrication. In order that the moulding be both attractive and durable, moulding substrates or workpieces are typically coated with various coating materials to provide an attractive finish to the product. Traditionally, mouldings have been coated by hand after the EPS moulding is secured to the exterior of the structure. This involved applying with hand tools, a layer of base coat to the moulding and then embedding a fiberglass mesh onto the moulding and allowing it to dry. A layer of stucco or special paint as a finish coat is usually subsequently applied to the base coated moulding after the moulding is installed. This method is very labor intensive and consequently, very slow and expensive. Often times, the quality of the applied base coating is not consistent due to poor workmanship. This results in a coating of uneven thickness which eventually cracks and does not look very attractive.

More recently, various types of automated equipment have been designed to apply coatings to different types of workpieces. For example, U.S. Pat. No. 5,514,417 discloses a method and apparatus for coating a molded fibrous workpiece with a foam material. In this method and apparatus, the workpiece is passed through a foam bath within a coating chamber. To ensure a good coating of the workpiece, the foam material is spread over the entire exterior surface of the workpiece using wipers within the coating bath.

Canadian patent 2,184,205 discloses a method and apparatus for applying a coating material onto the surface of a decorative workpiece. In this method, the workpiece is slid through a bath of coating material contained within a coating chamber where the coating material is applied simply under the weight of the material. The workpiece is slidingly advanced on a continuous flat platform by a set of guide rollers abutting both sides of the workpiece both before and after passing through the coating bath while simultaneously shielding the bottom surface of the workpiece. This method and apparatus does provide a coating on the decorative surface of the workpiece, however, the resultant coating may be inconsistent with respect to its thickness. This is partly due to the fact that the workpiece moves and slides about on the platform as it is being guided into the coating chamber. This is also true when the workpiece exits the coating bath, as lateral, horizontal and vertical movement will result in varying thicknesses of coating material being applied to the surface of the workpiece as it exits the coating bath. Furthermore, once in the coating chamber, the coating material may not be evenly distributed onto the intricate curves present on the exterior design of the workpiece. The coating material can bubble on the surface of the workpiece due to having the workpiece pass through a bath of thick, viscous coating material at varying speeds which results in different rates of shear of the material at the bath exit. Consequently, parts of the workpiece will not be coated adequately or not at all. Once the workpiece exits the bath, it may not be allowed to dry sufficiently before the guide rollers, continue to advance it forward and thus contact the wet coated workpiece and possibly damage its coating. Also, it is required that the coated mouldings air dry for at least 24 hours.

There is therefore a need to develop a novel method and apparatus for coating decorative workpieces used widely in various construction sectors, in a consistent, simple, efficient manner such to provide a smooth durable coating distributed in a controlled manner to desired exposed decorative surfaces of a workpiece. There is also a need to provide a finished coated workpiece which has a smooth, exterior coating finish which is aesthetically pleasing as well as very durable and thus resistant to damage.

SUMMARY OF THE INVENTION

In accordance with the present invention there is provided a method and apparatus for applying a plaster-like coating material to the decorative exposed surface of a preform workpiece. Both the method and apparatus provide on a consistent basis, a smooth durable coating with a controlled desired thickness to the entire exposed decorative surface of a workpiece. The coating as applied to the surface of the workpiece is tightly bonded thereto such that it cannot be removed therefrom without causing damage to the workpiece itself.

The method and apparatus avoid the problems of having air bubbles in the finished coating, delamination of the coating from the workpiece, the appearance of cracks in the coating or an uneven thickness of coating material left on the coated workpiece. The method and apparatus are relatively simple, efficient and cost effective and reliably on a consistent basis provide a means for applying a plaster-like coating to the exposed decorative surface of a workpiece on a commercial scale for use in the construction industry.

According to an object of the present invention there is provided an apparatus for applying a plaster-like coating material to exposed surfaces of a preform workpiece having a decorative exposed surface and a bottom portion, said apparatus comprising:
   means for mechanically advancing a workpiece along said apparatus along a straight horizontal axis over a non-continuous surface;
   means for engaging the bottom portion of a workpiece to constrain lateral and vertical movement as the workpiece passes along said apparatus; and
   means for applying a desired thickness of plaster-like coating material to a decorative surface of an advancing workpiece.

Preferably, the decorative preform workpiece has a mesh laminated to its decorative surface prior to being advanced through a coating chamber.

In one embodiment of the invention, the coating means is also adapted to apply a coating to the bottom outside edges of the bottom portion of the workpiece.

According to a further object of the invention is a method for applying a plaster-like coating material to exposed surfaces of a preform workpiece having a decorative exposed surface and a bottom portion, said method comprising the steps of continuously advancing said workpiece in a straight horizontal axis via engagement of said workpiece by its bottom portion to prevent lateral and vertical movement of said workpiece as it is being advanced;

applying a plaster-like coating material to the exposed irregular decorative surface of the advanced workpiece; and advancing the coated workpiece through a die opening closely conforming to the cross-sectional profile of the workpiece, wherein the cross sectional size of the die opening relative to the cross sectional size of the workpiece determines the thickness of the plaster-like coating material left remaining on the decorative surface of the coated workpiece.

According to yet a further object of the invention is a method for applying a plaster-like coating material to exposed surfaces of a preform workpiece having a decorative exposed surface and a bottom portion, said method comprising the steps of:

providing a workpiece having a thin mesh laminated to its entire decorative surface and to the outer bottom edges of the bottom portion of the workpiece;

continuously advancing said workpiece in a straight horizontal axis wherein said workpiece is engaged via its bottom portion to prevent lateral and vertical movement of said advancing workpiece;

applying a plaster-like coating material to the exposed irregular decorative surface of the workpiece; and advancing the coated workpiece through a die opening closely conforming to the cross-sectional profile of the workpiece, wherein the cross sectional size of the die opening relative to the cross sectional size of the workpiece determines and controls the thickness of the plaster-like coating material left remaining on the decorative surface of the coated workpiece.

According to still a further object of the invention is a method for bonding a plaster-like coating material to desired exposed surfaces of a preform workpiece having a decorative exposed surface and a bottom portion, said method comprising;

anchoring a thin mesh to the entire decorative surface of the workpiece and to the outer bottom edges of the bottom portion of the workpiece; and applying a plaster-like coating material under pressure to said anchored mesh to bond said mesh to said decorative exposed surface and to the outer bottom edges of the bottom portion of the workpiece, wherein said bonding creates a finished smooth protective coating on said workpiece.

Preferably, the bonding method is a two step process wherein the first step applies a coat of coating material which completely submerges the mesh and anchors it into the surface of the workpiece. The second step of the process provides a top coat of coating material which provides a smooth attractive durable finish. Typically, the first step provides a thicker coating of coating material and the second step provides a thinner coating material compared to the first step. If desired, additional thin layers of coating material can be applied to a coated workpiece.

According to yet another object of the invention is a preform workpiece comprising;

an elongate body having an exposed decorative surface and a substantially flat bottom portion; and means for facilitating the adherence of a coating material to the exposed decorative surface of said workpiece.

According to yet a further object of the present invention is a coated workpiece comprising;

a preformed workpiece having a decorative exposed surface with a plurality of spaced apart surface grooves orientated longitudinally along the length of said workpiece and a substantially flat bottom portion;

a mesh laminated to the exposed surface and partially about bottom outside edges of bottom portion of said workpiece; and at least one layer of a coating material bonding said mesh to the exposed decorative surface and to bottom outside edges of the bottom portion of said workpiece, wherein the coating material impregnates the mesh and anchors said mesh within said surface grooves within said decorative exposed surface such that the mesh and coating material are firmly bonded to the decorative surface of the workpiece, and wherein a thin layer of coating material also impregnates and anchors the mesh located about the bottom outside edges of the bottom portion of said workpiece.

Both the preform workpiece and the coated workpiece may additionally have a means for mounting such workpieces to a desired surface located in the flat bottom portion.

BRIEF DESCRIPTION OF THE DRAWINGS

A detailed description of the preferred embodiments are provided herein below with reference to the following drawings in which:

FIG. 2 is a cross-sectional view through lines A—A of FIG. 1 showing a workpiece inside a coating chamber;

FIG. 3 is a cross sectional view through lines B—B of FIG. 1 showing a workpiece inside the coating chamber;

FIG. 4 is an enlarged view of segment A in FIG. 3;

FIG. 11 is a side elevational view of the apparatus of FIG. 10;

FIG. 12 is an enlarged side elevational view of segment C in FIG. 11;

Figure 1:
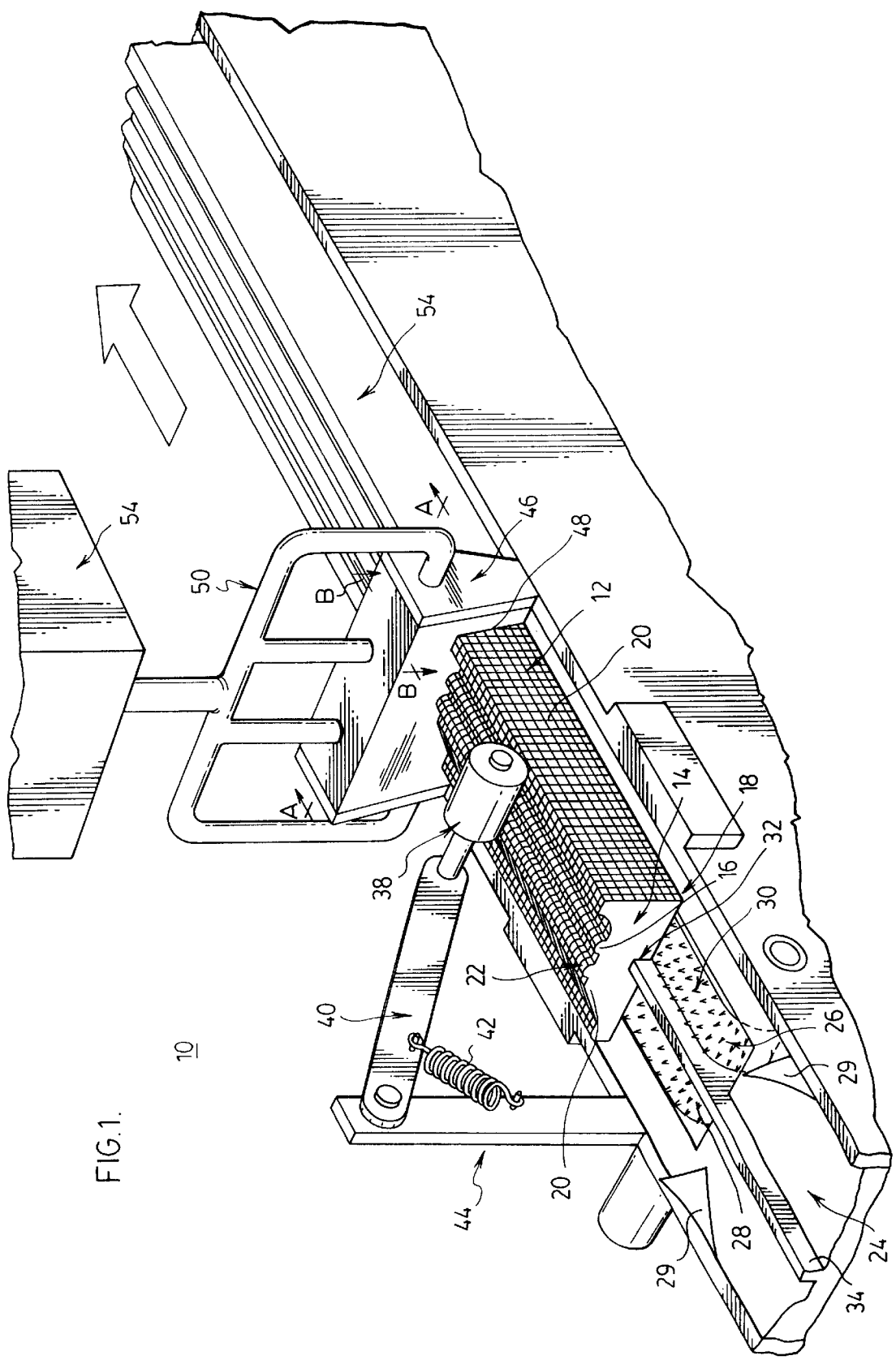
FIG. 1 is a perspective view showing the apparatus in accordance with a first embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

Referring to FIG. 1, there is illustrated a first embodiment of the apparatus 10 of the present invention in which a workpiece 12 is coated. The workpiece 12, better seen in FIG. 2, comprises a core 14 having an exterior decorative surface 16 which may be irregular in cross-section, but consistent along the workpiece length. A bottom portion 18 is provided on the workpiece which may be flat. A mesh 20 covers the entire decorative surface 16 of the workpiece. The decorative surface provides a unique cross-sectional profile 22 for the workpiece. The workpiece 12 is designed to be mounted on an exterior wall via its bottom portion 18 being secured or mounted on a mounting surface and in this manner the irregular decorative surface 16 is clearly visible.

Referring back to FIG. 1, the apparatus 10 comprises a platform 24 which supports a conveyor system for advancing the workpiece in a horizontal axis through the apparatus. The conveyor system consists of a pair of adjacent conveyor belts 26, 28 onto which the workpiece 12 rests. The conveyor belts 26, 28 have several spikes 30 which protrude upwardly and into the bottom portion 18 of the workpiece 12 to drive the workpiece directly through the apparatus while minimizing lateral movement of the workpiece 12 as it is being advanced through the apparatus. The workpiece 12 also has a channel 32 in its bottom portion 18 which is engaged by a corresponding rail 34 located in the middle of the platform 24 and separating the conveyor belts 26, 28. This engagement acts to constrain lateral and vertical movement of the workpiece as it advances through the apparatus. This also ensures accurate positioning of the workpiece as it is being advanced through the coating station of the apparatus to ensure that a controlled amount of coating is applied. The rail 34 is provided down the entire horizontal axis and length of the apparatus. Guides 29 are positioned on either side of the platform 24, and function to line up incoming uncoated workpieces immediately preceding a workpieces being coated.

A rotating tension wheel 38 is biased against the top decorative surface of the workpiece. This wheel rotates along the decorative surface of the workpiece as it is advancing through the apparatus upstream of the coating chamber and helps to restrain vertical movement of the advancing workpiece. The tension wheel is mounted to the platform by an arm member 40 which is spring loaded via a spring 42 to a vertical support 44. It is understood by those skilled in the art that more than one tension wheel can be used, depending on the width of the workpiece.

The workpiece 12 is advanced into an interchangeable coating chamber 46 via an inlet 48 closely conforming to the cross-sectional profile 16 of the workpiece through which the workpiece is advanced. The inlet is just large enough to allow the workpiece to enter the coating chamber but will not allow for the coating material to escape. Several conduits 50 enter and open into the chamber 46 through which a plaster like coating material 52 is fed preferably under pressure from a reservoir 54. The pressurization of the coating material ensures that the coating material is applied to all of the intricate surfaces of the workpiece as it is being advanced through the coating chamber 46. This also ensures that the coating material not only penetrates through the mesh and infiltrates into surface crevices of the workpiece, but also that the mesh is impregnated by the coating material and is thereby adhered to the workpiece surface by the coating material.

Preferably, the conduits 50 enter and open into the coating chamber 46 at both the top and sides of the chamber to ensure that coating material 52 is constantly supplied to all regions of the chamber and is thereby applied to the entire decorative surface. In accordance with a preferred embodiment, the application of the coating material under pressure results in an even application of the coating material and less buildup of material in the chamber.

As seen in FIG. 2, the workpiece 12 must move through the coating chamber 46 in a straight path in order that the now coated workpiece 54 can exit the coating chamber 46 via a die opening 56 closely conforming to the cross sectional profile of the coated workpiece in the proper orientation. This die opening 56 is slightly larger than the inlet 46 of the coating chamber so that a desired controlled thickness of coating material is applied under pressure on the decorative surface of the workpiece as it exits the coating chamber.

It is understood by those skilled in the art, that while the die opening 56 defined by die plate edge 57 conforms to the cross sectional profile of the workpiece, the size and shape of the die opening can vary in order to provide a controlled thickness of coating material in selected regions of the decorative surface. The die shape helps to provide the controlled thickness of coating material on the decorative surface of a workpiece. For example, the spacing of the die edge 57 from the workpiece surface may be greater at raised areas 55 of a decorative surface to provide a thicker coating in that region to ensure complete coating on the complex curves of the raised areas. It may also be desired to provide a thicker layer of coating material on flat portions 59 of the decorative surface of the workpiece where the workpiece will be adhered to a wall via a fastening means extending through the flat areas such as by use of retention screws. The thicker coating at 59, as such will provide a more secure fastening of the coated workpiece to a wall.

The resulting coated workpiece 54 is continually advanced through the apparatus engaged via its channel to the rail 34 before being removed from the apparatus. It is preferred that the coated workpiece as passed once through the apparatus be placed in a curing chamber for 8–12 hours after which it can be shipped for sale and use. As is best seen in FIG. 3, the coating chamber has angled walls 47 in order to create a shear edge at the point the coated workpiece leaves the chamber with a layer of coating material thereon. This forces coating material into a smaller cross-section. Consequently, the shearing of the coating material onto the surface leaves a smoother more desired finish.

The engagement of the workpiece with the platform of the apparatus via the rail 34 and the spikes 30 together act to drive the workpiece into and out of the coating chamber in the straightest and most stable manner possible in order to consistently provide a controlled even thickness of coating onto the exposed surface of the decorative workpiece as it enters and exits the coating chamber.

The workpiece 12 can be fabricated to have several different styles of decorative surfaces by the provision of different cross-sectional profiles 22. It is understood that the workpiece may be formed in a variety of ways depending primarily on the materials of construction. It may be milled, extruded or otherwise shaped. Preferably if the material is expanded polystyrene (EPS), a block of EPS is cut with a hot wire system to cut the decorative surface outline and thereby provide an elongate workpiece ready for coating. For example, the workpiece can be cut into 2.2 cm×11 cm (1"×5") plates, 6.6 cm×13.2 cm (3"×6") cornice mouldings, 2.2 cm×13.2 cm (1"×6") window and door trim and 2.2 cm×17.6 cm (1"×8") wall trim. The workpiece can also be cut into various sizes to be later adhered together to form columns. The length of the workpiece may also vary depending on the final use. Typical lengths of workpieces are approximately 2.5 m to 5 m long.

The workpiece used in the present method can be made of any suitable light weight material including wood and plastic. The preferred material is made of expanded polystyrene (EPS) or polyurethane. The phrase "decorative surface" as used herein refers to the portion of the workpiece that is exposed and readily seen when the workpiece is mounted to a surface, usually a wall. The decorative surface can be of any intricate shape or design.

It is understood by those skilled in the art that the method of the present invention can be used on workpieces of varying cross sectional sizes and designs as well as lengths. This may be accommodated by having a coating chamber with varying sizes and configurations of inlet and exit die opening. The coating chamber, itself, can be fabricated in several sizes dictated by the size of the workpiece and the size of the profile of the workpiece. The size of the exit die opening determines the thickness of coating material and shape of coating material left layered on the workpiece as it exits the coating chamber. The thickness of coating material can vary from about 2–4 mm due to the provision of an exit die edge 57 being spaced a corresponding extent away from the decorative surface of the workpiece. However, it is understood by those skilled in the art that the thickness of coating material may also vary according to the needs of the customers. It is also understood, that the workpiece can be coated more than once by advancing an already coated workpiece again through the coating chamber using a die opening larger than the first pass through the coating chamber.

Several different types of mesh can be used to laminate the workpiece prior to being coated with coating material. The mesh serves not only to reinforce the surface of the workpiece, but also helps to bind the coating to the workpiece surface to provide a hard, protective and attractive surface. Preferably, the mesh used on the decorative surface is made from a fiberglass having a protective coating. The mesh also has a tacky surface which is adhered to the decorative surface of the workpiece. In accordance with the preferred embodiment of the coating material being applied under pressure, this results in the mesh being impregnated with the coating material which then cures to provide a hardened surface.

The mesh is applied to the decorative surface as well as wraps around just underneath the bottom flat outside edges of the workpiece to ensure that all surfaces and edges are properly coated and the mesh embedded. This also helps to prevent the mesh from unraveling at the bottom edges of the workpiece. The bottom portion of the workpiece remains uncoated. The provision of the mesh wrapping around the bottom flat edges of the workpiece also provides a means for the mounting of the coated workpiece to a vertical surface. To mount the coated workpiece, the wrapped around mesh portions are pulled away from the flat bottom portion of the workpiece and spread out vertically away from the body of the workpiece. The coated workpiece is then placed against a vertical surface and permanently mounted to a wall with the application of an adhesive, nails or screws to the vertically extended mesh. With the coating material reinforcing the mesh to the bottom edges of the workpiece, this provides a more secure fashion to mount the coated workpiece to a vertical surface such as a wall.

Figure 5:
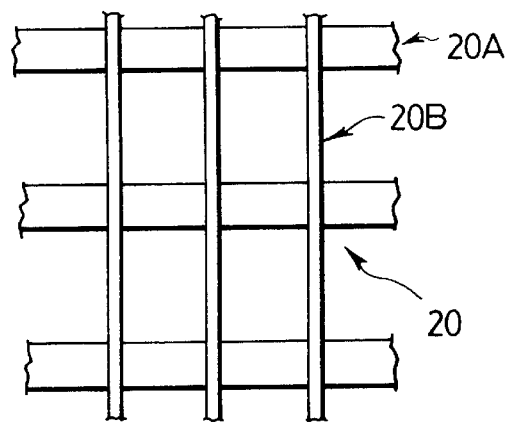
FIG. 5 is an enlarged top plan view of the preferred mesh for use in laminating the decorative surfaces of the workpiece in accordance with the present invention.

As seen in FIG. 4, the mesh may be specifically engineered to comprise thick strands of glassfibre 20A interspersed with 4 to 6 thinner strands 20B of glassfibre. While the mesh is shown to comprise a criss cross pattern of mesh, it is also desirable to use a mesh which includes a longitudinal pattern of fibreglass strands with differing thicknesses. The coating material 52, is shown to completely submerge the mesh 20. A preferred mesh for use in the present invention is shown in FIG. 5. This mesh has wide, flat longitudinal strands 20A with criss-crossing narrower, but thicker strands 20B. As laminated onto the surface of the workpiece, the wider strands are supported above the narrow strands and provide a space for the coating material to impregnate the mesh. Thus this specifically engineered mesh allows for the coating material to flow underneath and embed the raised thinner strands 20B in the coating material, and into the intricate surface of the workpiece, such as in crevices, and in this manner, better adhere the mesh and the coating material to the surface of the workpiece.

It is understood by those skilled in the art that several different types of coating materials can be used in the method and with the apparatus of the present invention including cement-based, polymeric based and the like so long as the coating cures to a fine smooth finish that is visually appealing. A preferred type of coating material for use in the present invention is a polymeric based coating that is resilient when cured.

Another embodiment of the present invention is shown in FIGS. 6 through 9 and is designed to further enhance the anchoring of the mesh 20 and the bonding of the coating to the preform workpiece surface. In this preferred embodiment, the workpiece 65 is fabricated to have multiple grooves or channels 66 along its exposed decorative surface 67 that may run along the entire length of the workpiece 65 as clearly shown in FIGS. 8 and 9. Such grooves 66 are preferably spaced apart approximately ½ inch along the exposed surface and are approximately $1/8^{th}$ inch deep.

Alternatively, the grooves can be discontinuous and alternatively positioned or staggered on the surface of the workpiece. These grooves perform the function of assisting the coating material to tightly anchor the mesh 20 to the workpiece. As the coating material is applied under pressure to the surface of the mesh laminated workpiece (seen in FIG. 6), it flows throughout the mesh and into the grooves. As the coating cures with the mesh embedded therein and the coating is in turn embedded in the grooves, this fixes or secures the mesh on the surface of the workpiece forming a tight bond illustrated in FIG. 7. The coating material 52 impregnates the surface grooves and impregnates through the mesh 20 and into the grooves 66 and intricate crevices of the surface 16 of the workpiece. This impregnation achieves a very tight bond such that the cured coating cannot be easily chipped or peeled away from the workpiece. To demonstrate the strength of the bond between the coating and the workpiece itself, any attempt to strip the coating from a styrofoam workpiece would tear away the embedded mesh and remove a surface layer of the styrofoam (EPS) preform thus substantially damaging it. This tight bond of the coating material to the workpiece surface is truly unique and is not present on any coated workpiece currently available on the market. This is particularly advantageous where the coated workpieces may be exposed to potential accidental damage at a construction site.

Prior art coating methods provide a laminated coating which can be easily delaminated by pulling off the mesh and cured coating without appreciably tearing away the surface of the workpiece. In this sense, the coating of the prior art is merely layered onto the workpiece surface. In contrast, in the method of the present invention, the provision of surface workpiece grooves together with the specialized mesh and the novel coating apparatus, results in a coating that doesn't merely layer on the surface of the workpiece, but actually bonds and cements into the irregular surface of the workpiece. The mesh and cured coating are caused to embed into the granular matrix of the styrofoam workpiece. Any attempt to strip the mesh and cured coating from the workpiece, rips apart the individual beads of the styrofoam and thus the construction of the workpiece body. This is not seen with any coated workpiece of the prior art. Due to this very adherent and bonded coating, the coated workpiece can withstand a great deal of wear and tear without sustaining any substantial damage or delamination and therefore is easy to install as it requires no special care or attention.

The provision of the grooves spaced along the entire length of the workpiece creates a novel type of moulded coated workpiece which cannot be easily delaminated yet retains its lightweight and flexible characteristics. It is understood by those skilled in the art, that the number, length and placement of grooves and the size of groove on the surface of the workpiece may vary depending on the size of the workpiece to be coated. It is also understood that rather than continuous or discontinuous grooves provided on the decorative surface of the workpiece, small holes or indents can be punched evenly or randomly spaced on the surface of the decorative workpiece to help anchor the mesh with coating material to the surface of the workpiece. The type or shape of groove, hole or indent is not limiting so long as coating material can be forced into such in order to bond the mesh tightly to the decorative surface. It is also appreciated that grooves, holes or indents may be mechanically placed on the surface of the apparatus at a station upstream of the coating chamber and upstream or downstream of a mesh laminating location.

Figure 6:
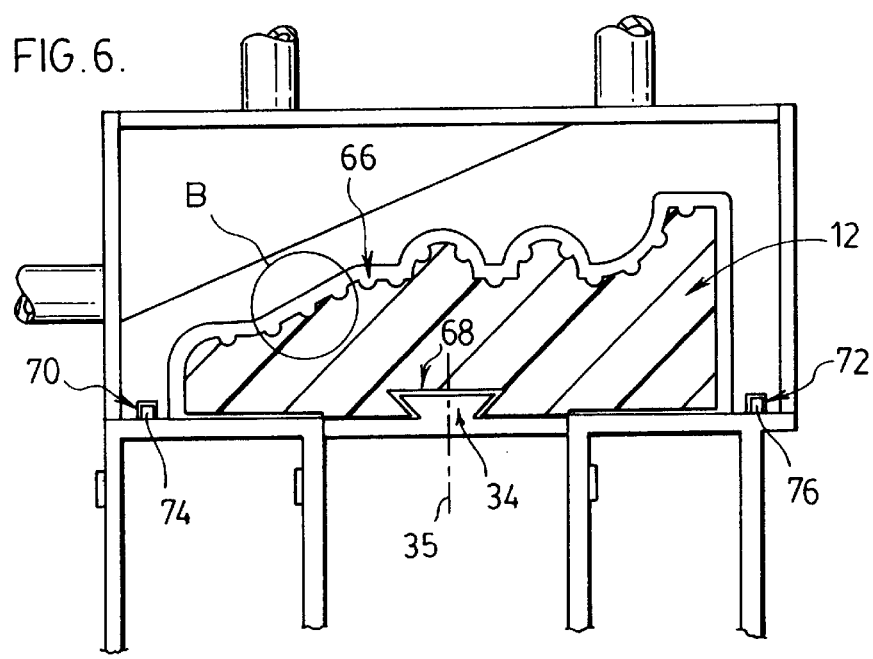
FIG. 6 is a cross-sectional view through lines A—A of FIG. 1 showing a different embodiment of the workpiece and apparatus, the workpiece having a dovetail channel and surface grooves and the apparatus having a correspondingly fitting rail for the dovetail channel.
Figure 7:
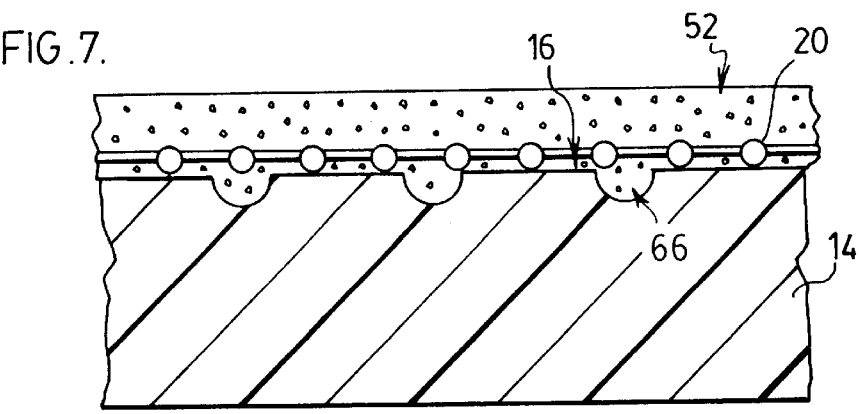
FIG. 7 is an enlarged view of segment B in FIG. 6.
Figure 8:
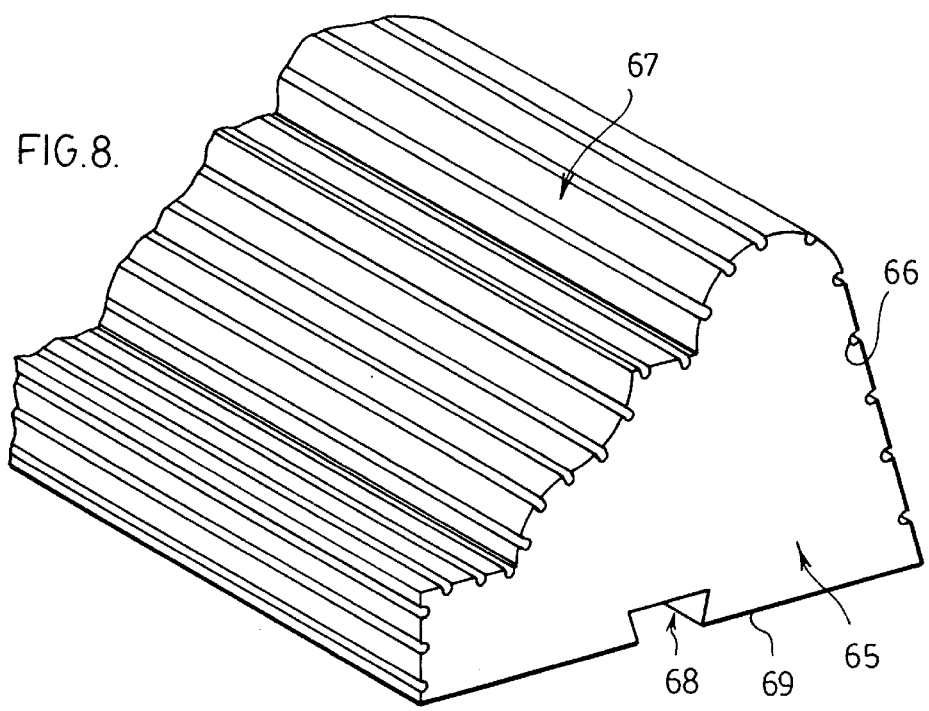
FIG. 8 is a cross-sectional perspective view of the workpiece of FIG. 6 before coating showing its dovetail channel and surface grooves.
Figure 9:
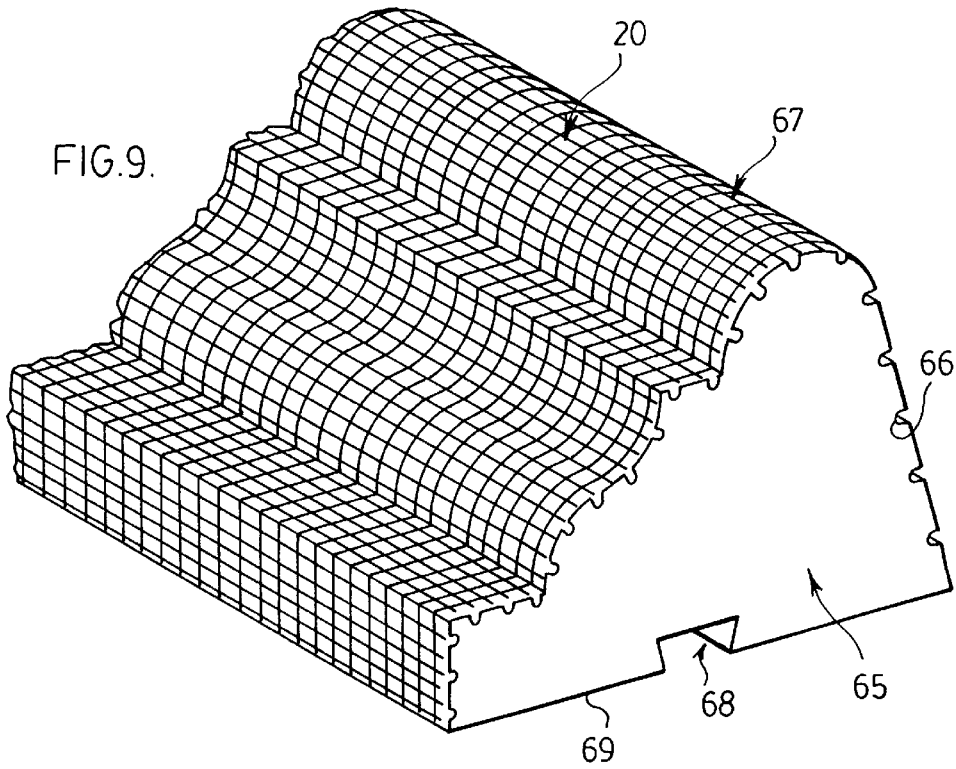
FIG. 9 is a cross-sectional perspective view of the workpiece of FIG. 8 having a mesh laminated to its exposed surfaces, prior to being coated.

As also seen in FIGS. 6, 8 and 9 in this preferred embodiment of the invention, the workpiece 65 has a dovetail channel 68 to engage with the corresponding shaped rail 34 located in the middle of the platform 24. This channel runs preferably along the middle of flat bottom portion 69 of the workpiece and along the entire length of its longitudinal axis. The design of the dovetail channel helps to restrain both lateral and vertical movement of the entire length of workpiece as it advances and is driven forward on the conveyor system supported within the noncontinuous platform and through the coating chamber to ensure an even thickness of coating material is applied to the surface of the workpiece. The rail extends along substantially the entire length of the non continuous platform including within the coating chamber and onto the downstream end of the platform. In this manner the workpiece is well restrained to minimize erroneous movement in order to provide an even and consistent coating onto the workpiece surface.

While the preferred shape of rail is shown to be dovetailed, it is understood by those skilled in the art that the rail and corresponding channel located within the bottom portion of the workpiece can be of varying configurations having some degree of undercut in order that the engagement of both the rail and channel of the workpiece acts to hold the workpiece in place in a horizontal axis when advanced along the apparatus. For example, the rail and correspondingly fitted channel can be T-shaped.

In this preferred embodiment of the invention, the coating chamber has locating slots 70, 72 as shown in FIG. 6, adjacent to and on either side of the die opening which engage with corresponding spaced centering projections or pins 74, 76 located on the platform 24 of the apparatus. These slots and projections are spaced to ensure that the rail 34 is preferably located at the exact desired position in the die opening 56. It is the rail that controls the proper positioning of the workpiece as it is being advanced through the die opening. Preferably, the rail is centrally positioned in the die opening as indicated by centre line 35. Thus the provision of locating slots on the sides of the die opening with centering projections located on the platform ensures that the workpiece advances in the correct orientation into and through the coating chamber and thus be properly and evenly coated. It is understood that more than one rail can be used in the method and apparatus of the present invention to properly advance a workpiece through the apparatus. This is especially true for larger, wider workpieces for which the additional dovetail grooves and their engagement with additional rails would provide for more stability during advancement of a large, wide workpiece. The locating slots and centering projections thus provide an easy and quick method to ensure that the rails are properly positioned within the die opening and for the entire apparatus.

It is understood by those skilled in the art that the apparatus of the present invention may include a continuous process whereby the workpiece is first coated with mesh and then directly with coating material prior to curing. Alternatively, the apparatus may comprise one or more stations including curing and mesh laminating stations where desired. The distance between various stations may also vary.

In the method of the present invention, the workpiece having mesh adhered to its surface, is mounted via its channel onto the corresponding rail of the apparatus. The workpiece is mechanically advanced over the non-continuous surface into the coating chamber via the inlet. Inside the coating chamber, coating material is fed under pressure in order to infiltrate and impregnate the intricate surface of the workpiece and the overlying mesh as it travels through the coating chamber. As the workpiece continues to be mechanically advanced, it exits the coating chamber through an exit die having a cross sectional profile which determines the desired thickness of coating to be applied. As such, the die profile may correspond essentially to the cross sectional profile of the workpiece or may be different in certain sections if it desired to have a thicker coating in certain regions of the decorative surface. The exit die may be slightly greater in cross sectional profile as compared to the workpiece in order to leave a desired thickness of coating material on the workpiece as it exits the chamber. The coated workpiece is then cured in a dehydration chamber in which the environmental factors are controlled to ensure an even and rapid curing of the coating material onto the workpiece. The cured workpiece is then ready for use. Throughout the entire coating method, the bottom portion of the workpiece is not exposed to coating material and therefore remains uncoated.

Figure 10:
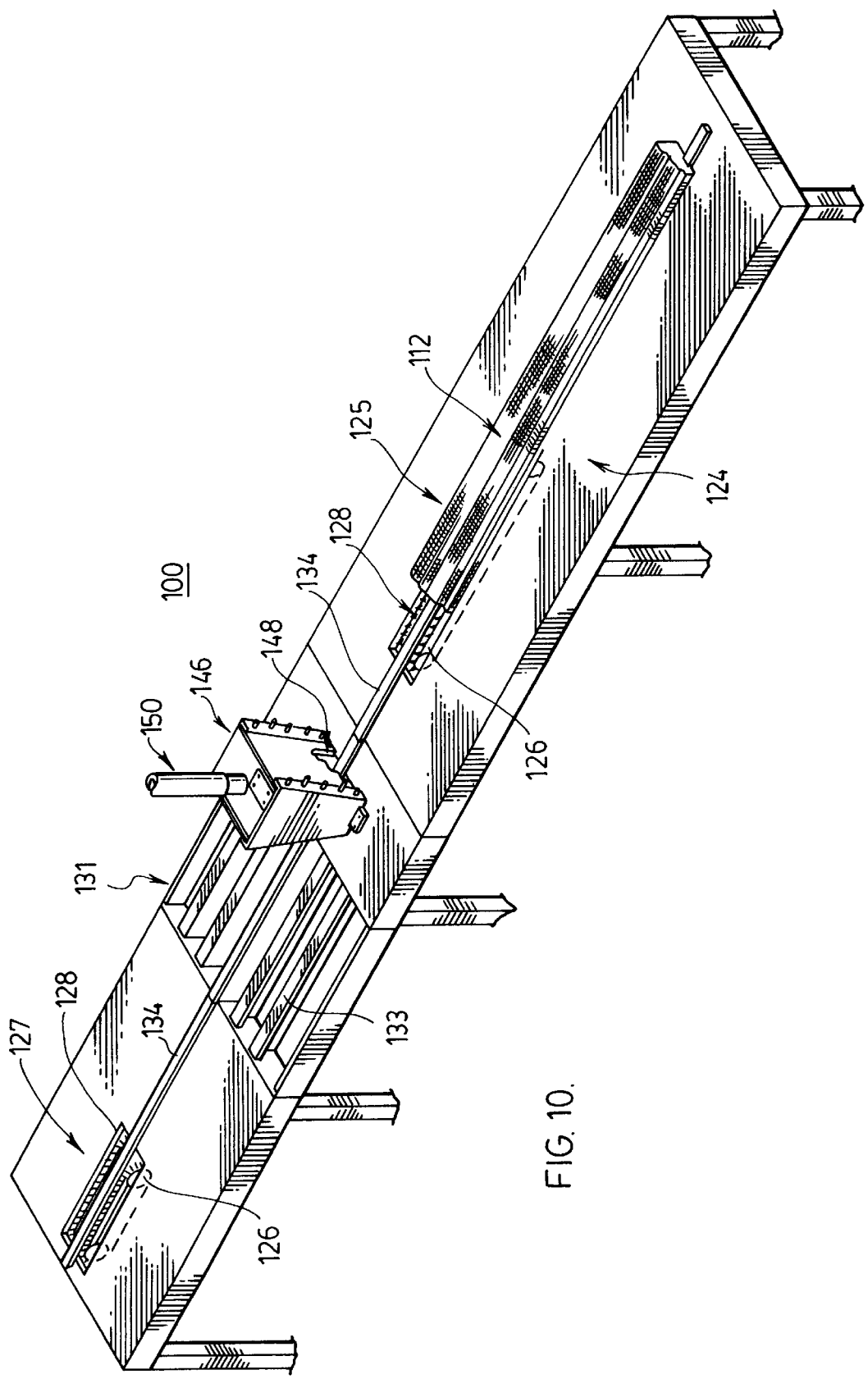
FIG. 10 is a perspective view showing an apparatus in accordance with another embodiment of the present invention.

Another most preferred embodiment of the invention is illustrated in FIGS. 10 and 11 in which the apparatus is indicated as reference numeral 100. In particular, a different coating chamber design is used in this embodiment of the invention. In this embodiment of the apparatus it is preferred to use a workpiece having a dovetail channel 168 located in the bottom portion 1 18 of the workpiece 1 12. The apparatus 100 comprises a non-continuous platform 124 which supports two conveyor systems 125 and 127. Conveyor system 125 is positioned upstream of a coating chamber 146 and the other conveyor system 127 is positioned downstream of the coating chamber 146. The conveyor system 127 positioned downstream of the coating chamber 146 may be set at a different speed from that of the first conveyor system 125 positioned upstream of the coating chamber 146. In this manner, the second conveyor system 127 helps to separate the coated workpieces as they exit the coating chamber 146 which speeds up the entire coating process as the separated coated workpieces can then be quickly moved into an environmentally controlled curing chamber.

Each conveyor system 125, 127 comprises a pair of adjacent conveyor belts 126, 128 onto which the workpiece 112 rests. The conveyor belts have several spikes 130 which protrude upwardly above platform 124 and into the bottom portion 118 of the workpiece 112 which act primarily to drive the workpiece along and through the apparatus but also help to prevent lateral movement of the workpiece 112 as it is being advanced and driven through the apparatus. This is particularly exemplified in FIG. 12. The preferred workpiece 112 for use in this embodiment preferably has a dovetail channel 168 in its bottom portion 118 (shown in FIGS. 8 and 9) which engages with a corresponding dovetail rail 134 located in the middle of the non-continuous platform 124 and separating the conveyor belts 126, 128. This engagement in addition to the spiked conveyor belts acts to guide movement of the workpiece through the apparatus while constraining lateral and vertical movement of the workpiece as it being driven and advanced through the apparatus. In this manner, additional restraining components such as a rotating tension wheel are not required. The dovetail channel 168 and corresponding dovetail rail 134 also ensure accurate positioning of the workpiece as it passes through the apparatus. In addition, the rail system facilitates passing of the coated preform over an open space 131, downstream of the coating device 146. The open space has rail 134 passing over the open space 131. Beneath the open space 131 may be a drip pan to collect any excess coating which may drop from the coating chamber. The open space 131 has adjustable rails 133 to engage selected portions of preform bottom after it immediately exits the coating chamber 146.

While the spiked conveyor belts are shown to be positioned to engage the bottom portion of the workpiece to drive the workpiece through the apparatus, it is also understood that such spiked conveyor belts can be engineered to engage the workpieces at the sides or the exposed decorative surface to drive the workpiece straight through the apparatus. The spiked conveyor belts can be made to extend any desired length of the non-continuous platform upstream and downstream of the coating chamber. Spiked conveyer systems may also be modified to comprise any means to "hold" or "anchor" the bottom portion of the workpiece as it is being advanced via the conveyor belts. Such means may also include providing a tacky adhering surface for the conveyor belts or alternatively suction means.

The workpiece is advanced into an interchangeable coating chamber 146 via an inlet 148 which may closely conform to the cross-sectional profile of the workpiece through which the workpiece is advanced. The inlet is just large enough to allow the workpiece to enter the coating chamber but minimizes the escape of pressurized coating material therefrom. A conduit 150 enters and opens into the top of the coating chamber 146 through which the coating material is fed under pressure from a reservoir.

Figure 13:
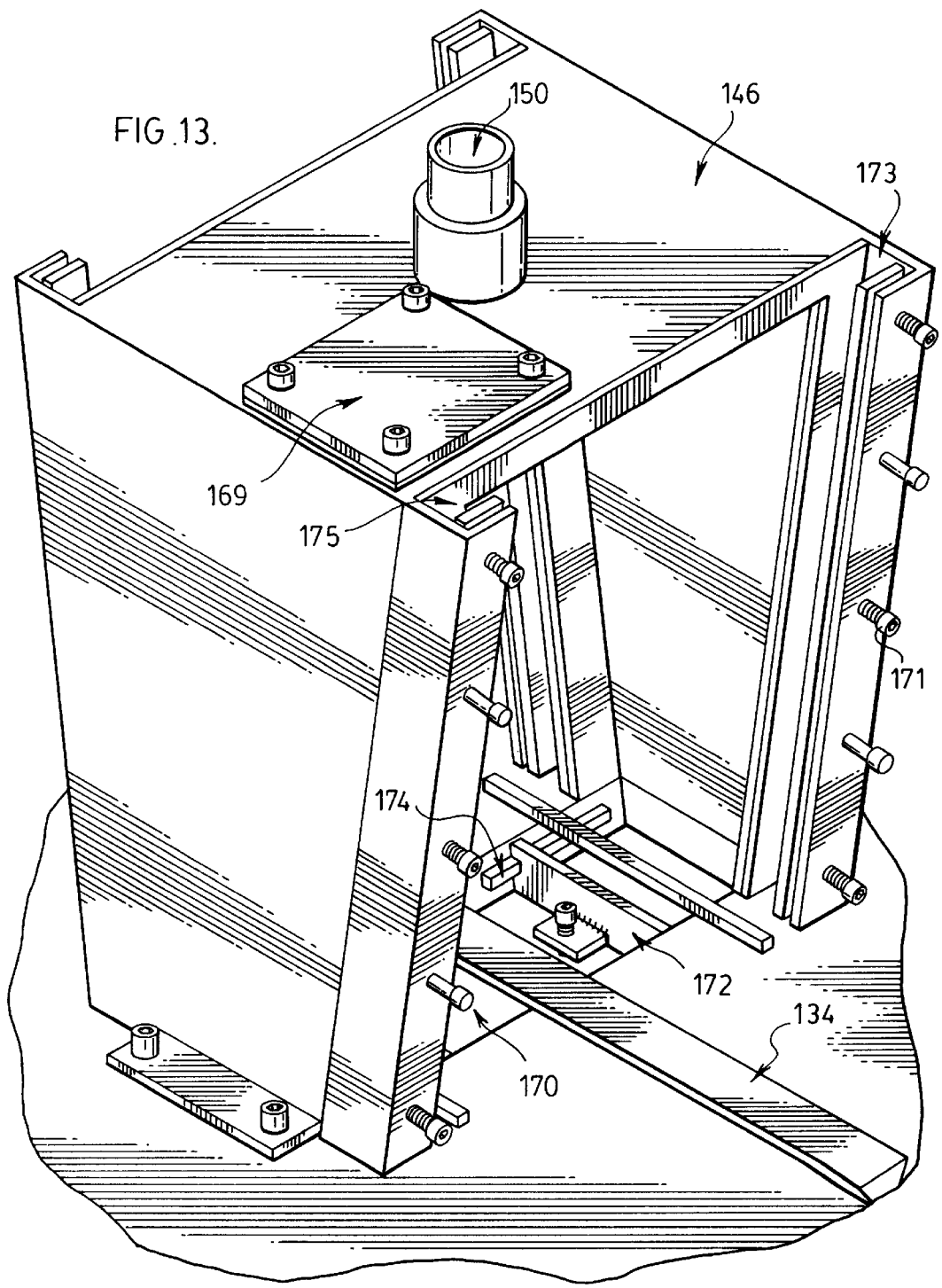
FIG. 13 is an enlarged perspective view of the coating chamber of the apparatus of FIG. 10.
Figure 14:
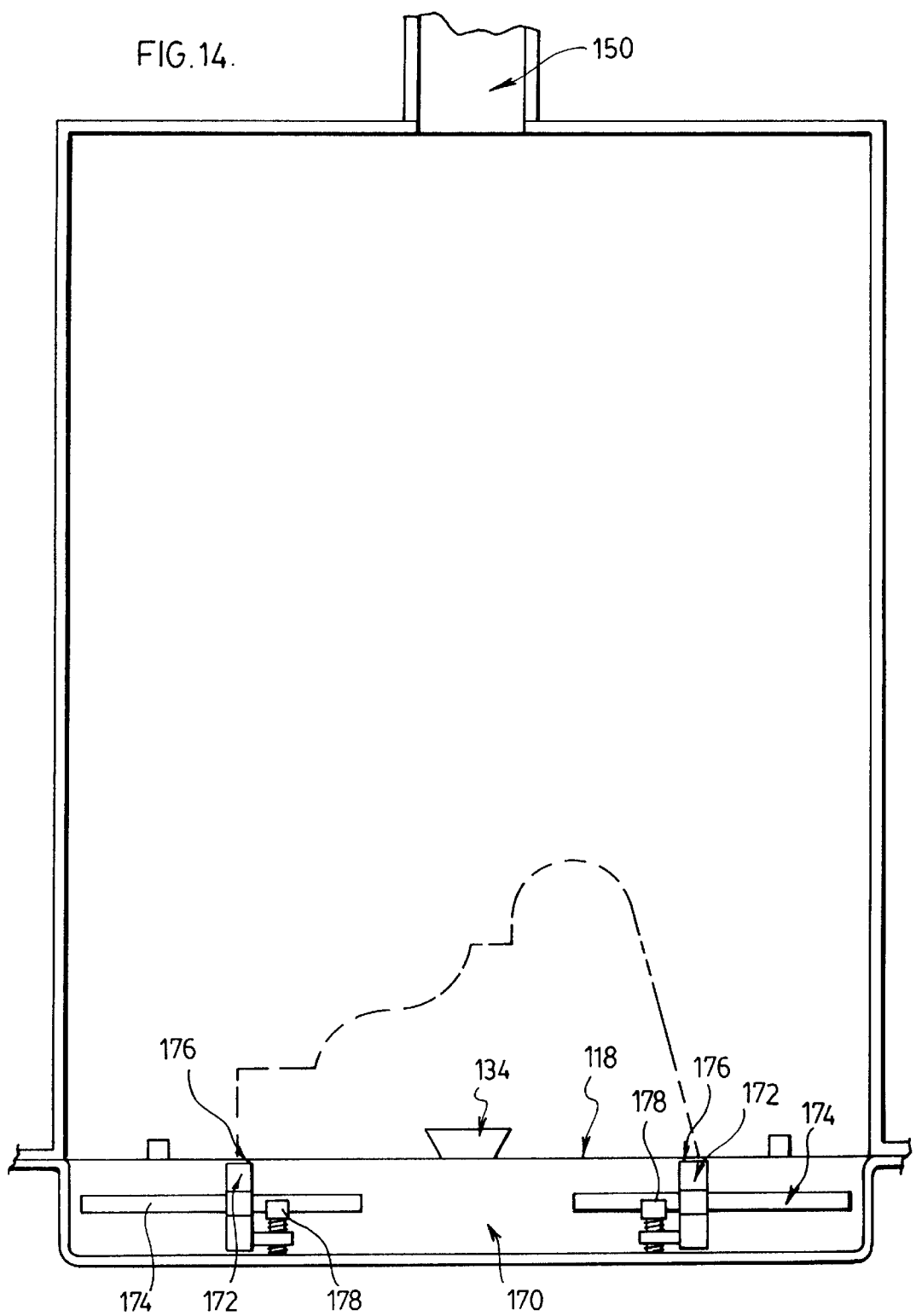
FIG. 14 is an enlarged front cross-sectional view of the coating chamber of FIG. 13.

As better seen in FIG. 13, the dovetail rail 134 is continuous through the coating chamber 146 and it engages the bottom portion of the workpiece along the entire length of the discontinuous apparatus surface. A removable hatch 169 is provided at the top of the coating chamber. This hatch can be removed in order to gain entry into the coating chamber during the coating process and agitate the coating material. Defining the bottom of the coating chamber is a trough 170 in which are located spaced apart dams 172 slidingly engaged on spaced apart rails 174. As seen in FIG. 14 the dams 172 are movable in order be properly positioned and substantially aligned with the bottom outside edges 176 of the bottom portion 116 of the advancing workpiece. The rails 174 are fastened to the bottom of the trough 170 by bolts 178. This arrangement prevents the bottom portion of workpiece being coated in general. Surprisingly, this also provides on a consistent basis a controlled application of a very thin, even coating of the coating material only to the bottom outside edges 176 of the bottom of the workpiece 118 which surprisingly provides a more durable coating finish to the workpiece. This lip of coating material helps to bond and seal the mesh about the outside bottom edges 176 of the bottom portion of the workpiece 118 so it is virtually impossible to remove the coating material from the workpiece without the workpiece itself sustaining a great deal of damage. The provision of a trough 170 and moveable dams 172 functions specifically to allow for varying widths of workpieces to be advanced through the coating chamber and obtain an even layer of coating material on the decorative surface while simultaneously applying a controlled amount of coating material to the outside bottom edges 176 of the bottom portion 116 of the workpiece on a consistent basis. The dams 172 in particular help to provide an even pressure of coating material on the sides of the workpiece resulting in a cleaner, consistent finish on the bottom outside edge 176 of the bottom portion of the workpiece. Coating material is not applied to the entire bottom portion of the workpiece even though the bottom surface of the workpiece is not shielded from the coating material by the platform of the apparatus. To reiterate, this thin coating is important to better anchor the mesh to the surface of the workpiece in particular, about its bottom outside edges, such that the mesh is tightly anchored and very difficult to remove from the surface of the workpiece without causing substantial damage to the workpiece. This creates a better durable coating finish on the workpiece.

A sealant can also be used in conjunction with the dams in order to help maintain the seal about the dams and thus pressurization of the coating material within the coating chamber. A suitable sealant can be a type of putty or alternatively, a rubberized gasket.

Figure 15:
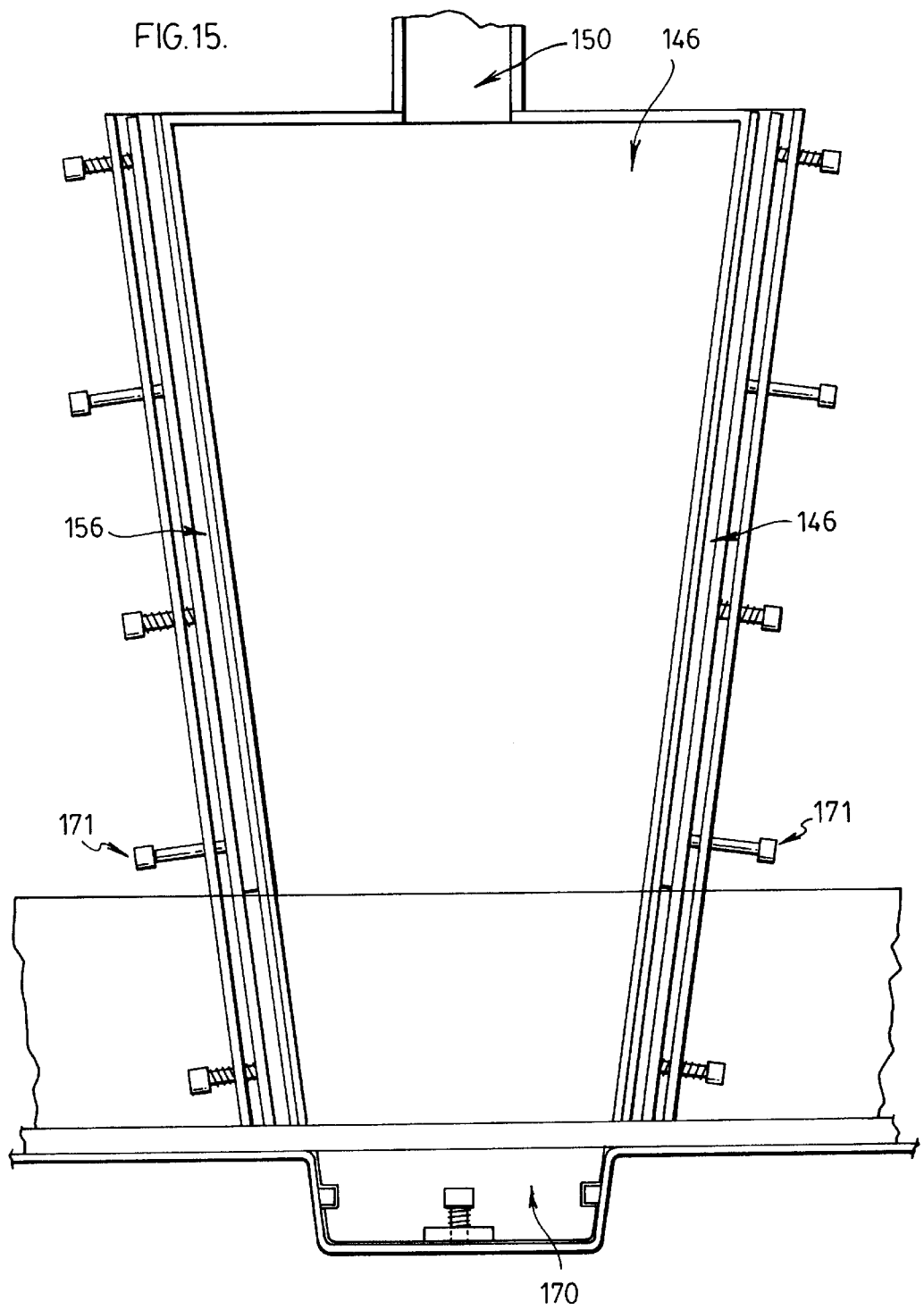
FIG. 15 is an enlarged side cross-sectional view of the coating chamber of FIG. 13.
Figure 16:
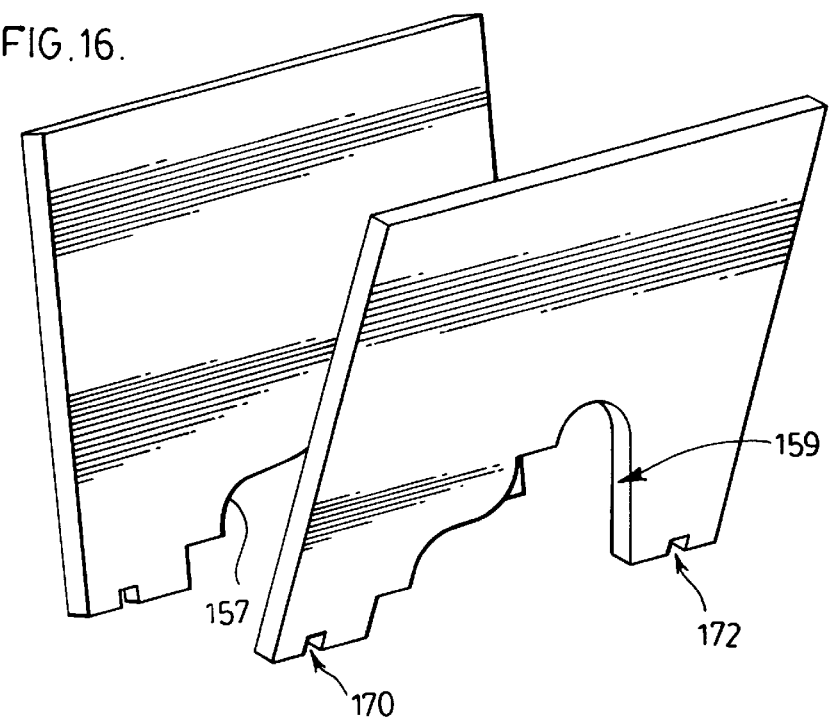
FIG. 16 is a perspective view of the die plates of the coating chamber.

FIG. 15 shows that the trough 170 defines the bottom portion of the coating chamber 146 over which the workpiece is advanced. This figure also shows the angled position of the die opening 157 and the inlet 159. The angling of the plates provides a trowelling effect at the outlet die to smooth out the coating as it exits the die. The angling of the inlet and outlet plates of about 5° from vertical provides in accordance with this preferred embodiment an exceptionally smooth finish due to the enhanced trowelling action. As seen in FIG. 16, the die opening 157 and the inlet 159 are essentially interchangeable plates which are removable from the coating chamber by releasing bolts 171 which clamp edges of the plates in clamping channel 173 and 175. The locating slots 170, 172 are positioned within the die opening and the inlet plates.

Figure 17:
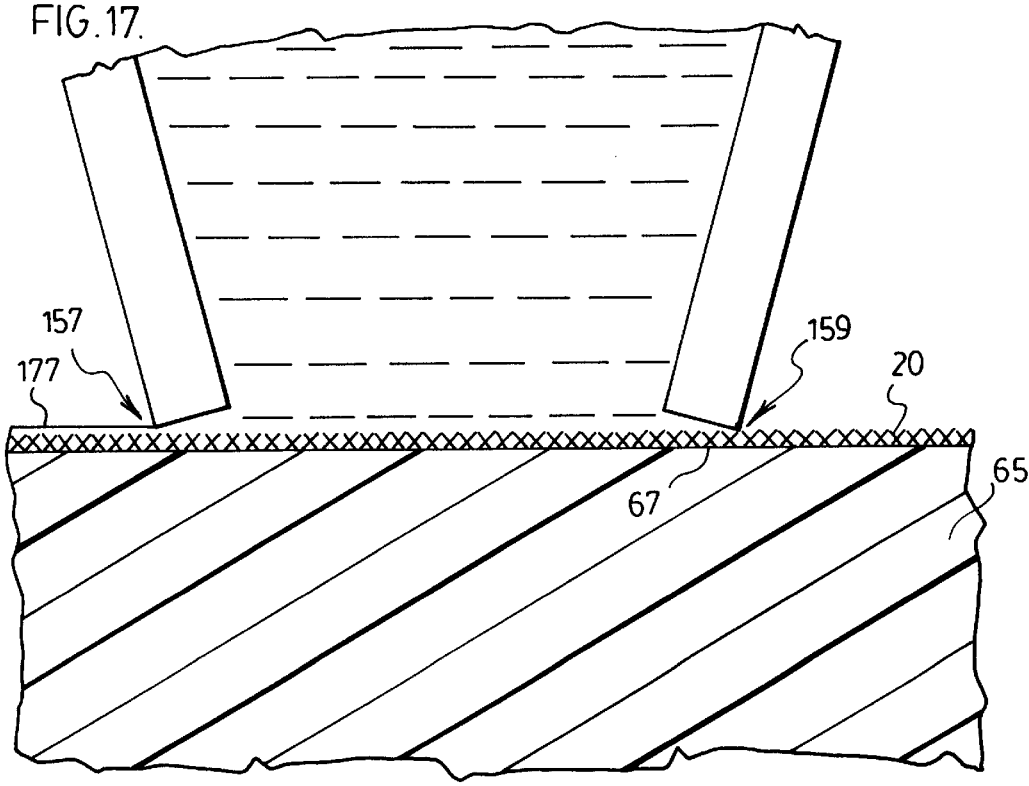
FIG. 17 is an enlarged side cross-sectional view of a workpiece moving through the coating chamber of FIG. 13 and receiving a first coating.
Figure 18:
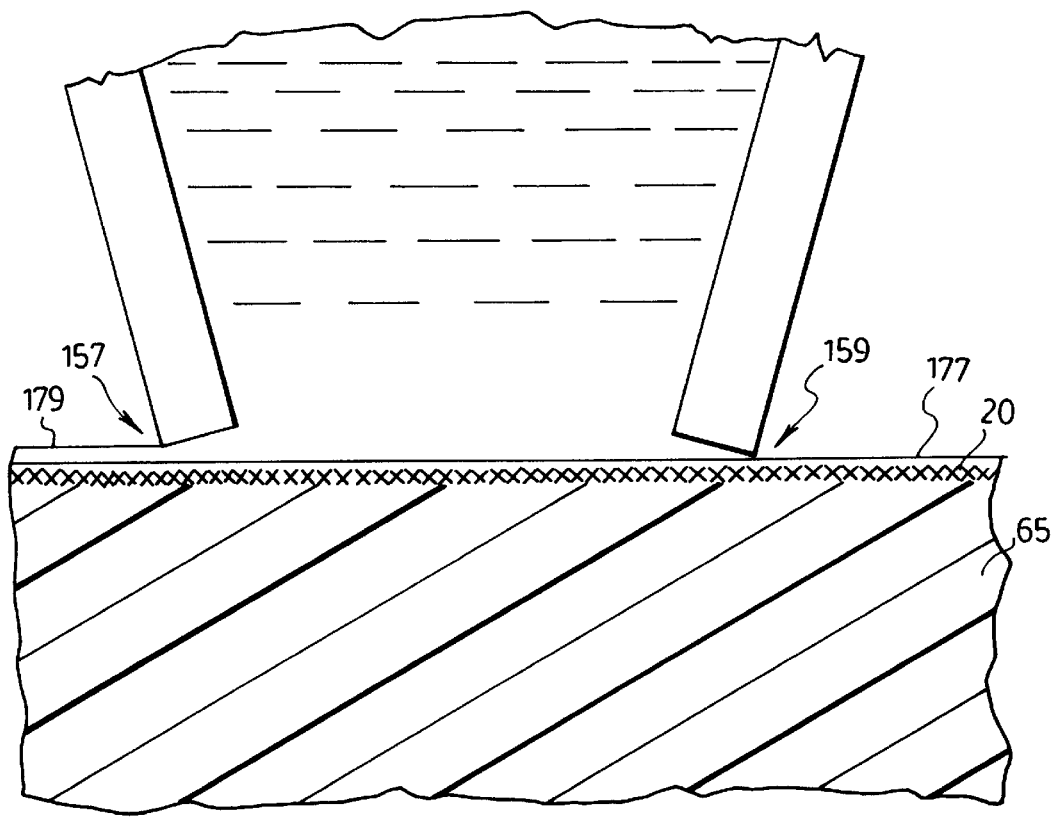
FIG. 18 is an enlarged side cross-sectional view of a coated workpiece moving a second time through the coating chamber of FIG. 13 to receive a second coating.

The embodiment of the apparatus shown in FIG. 10 can be used to provide multiple layers of coating material on the exposed desired surfaces of the workpieces. For example, in FIG. 17, a workpiece 65 having a mesh 20 laminated thereon is shown being advanced through the coating chamber 146 wherein the cross sectional profile of the die opening is greater than the cross sectional profile of the inlet thus leaving a first layer of coating material 177 on the mesh laminated workpiece. The first layer 177 is thick enough to submerge and embed the mesh 20 onto the surface 67 of the workpiece including the surface channels. In FIG. 18, a workpiece 65 having a first layer 177 of coating material embedding the laminated mesh 20 thereon is shown to be advanced a second time through the coating chamber leaving a second top coat 179 or finishing coat of coating material to the desired exposed areas of the decorative workpiece. It is appreciated that the plates 157 and 159 may be interchanged in applying the first and second coats. Plate 157 is positioned on the outlet side for the first coat with the plate 159 at the inlet side. The plates are switched to apply the second coating.

Figure 19:
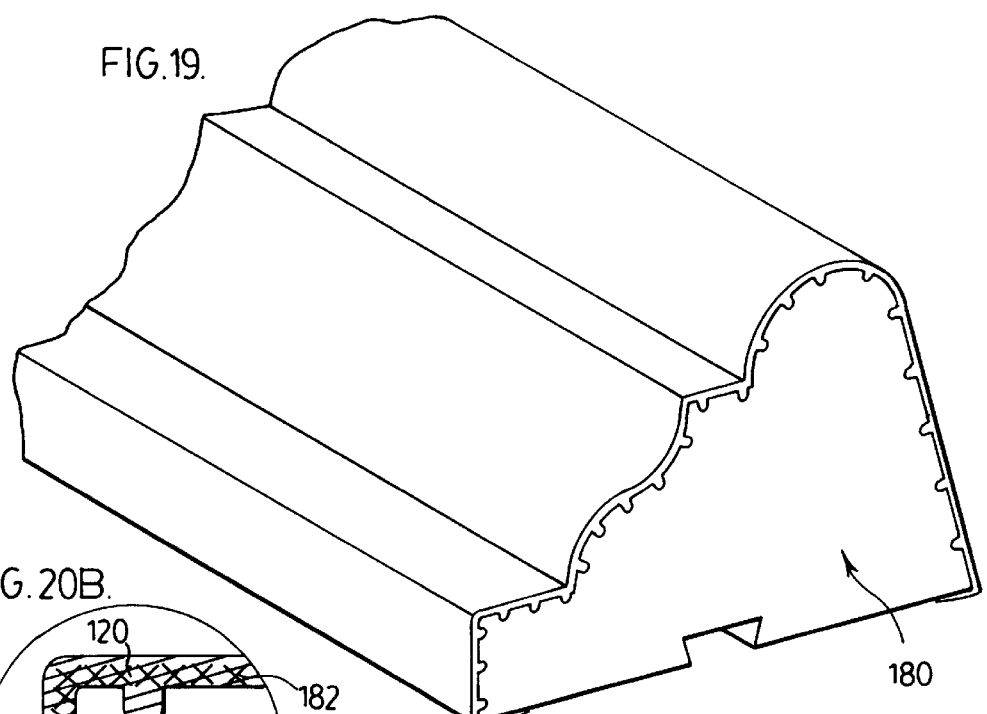
FIG. 19 is a cross-sectional perspective view of a finished coated workpiece having first and second coating layers, in accordance with a method of the present invention.
Figure 20B:
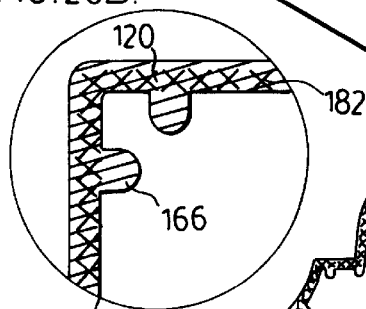
FIG. 20B is an enlarged view of segment D of FIG. 20A.
Figure 20A:
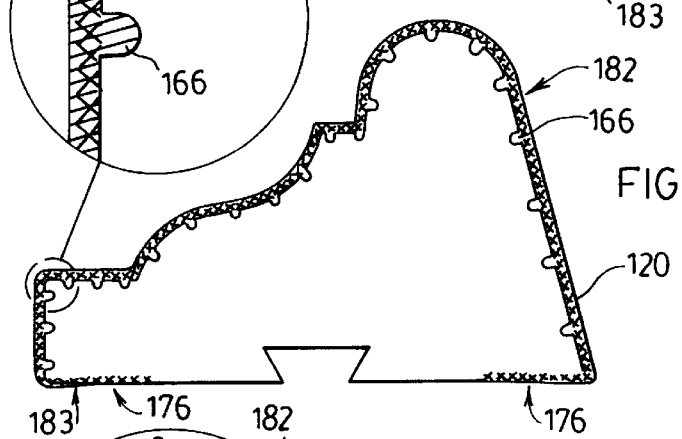
FIG. 20A is a cross-sectional view of a workpiece having a first anchoring coating.

In accordance with the embodiment of the apparatus shown in FIG. 10, it is most preferred to use a two step method for making a coated finished decorative workpiece 180 as shown in FIG. 19. The first step involves passing a mesh laminated workpiece through the apparatus and the coating chamber along a straight horizontal axis. The workpiece is engaged with the rod of the platform of the apparatus via its dovetail channel. The first step acts to provide a first layer 182 of coating material to the exposed decorative surface and the outside bottom edges 176 of the workpiece as seen in FIG. 20A to anchor the mesh 120. FIG. 20B shown this first anchoring step acts to impregnate and anchor the mesh 120 into the surface grooves 166 of the workpiece such that the coating material infiltrates all of the grooves, cracks and crevices located in the surface of the workpiece and beneath the mesh. Once the coated workpiece is driven through the coating chamber the first time it is then placed in an environmentally controlled chamber for 2–4 hours in order that the first anchoring coating layer cures and shrinks onto and into the decorative surface and outside bottom edges of the bottom portion of the workpiece. The workpiece is then run through the apparatus a second time with suitable changes made to the interchangeable plates to apply a second top coat 184 or finishing coat to the workpiece. The second top coat 184 of coating material also helps to provide a more durable finish to the workpiece. The finished coated workpiece is then again placed in the environmentally controlled chamber for 2 to 4 hours for curing. The finished cured workpiece is then ready for delivery and use. Alternatively, the coated workpiece 180 can be run through the apparatus again with suitably sized plates defining the inlet and die opening to apply an additional thin layer of coating material to the decorative surface of the workpiece.

Figure 21B:
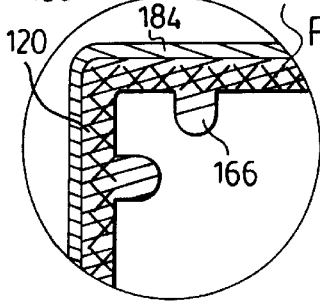
FIG. 21B is an enlarged view of segment E of FIG. 21A.
Figure 21A:
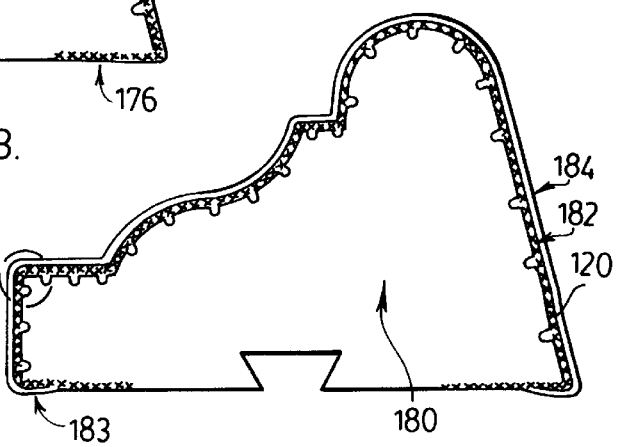
FIG. 21A is a cross-sectional view of the finished workpiece of FIG. 19.

The finished workpiece as seen in FIG. 21A has a first layer 182 of coating material infiltrating and impregnating the mesh 120 into the surface grooves of the workpiece and a second top layer 184 of coating material over the first layer. The outside bottom edges of the bottom portion of the workpiece 176 also has a very thin layer of coating material 183 that adds virtually no additional thickness over and above the thickness of the laminated mesh 120 such that the workpiece can be mounted via its bottom portion virtually flush against any surface.

Again, FIG. 21A illustrates the finished coated workpiece 180 made by the two step process of the present invention. In the first step, a first layer 182 of coating material is forced into the surface grooves of the workpiece to embed and bond the mesh 120 thereto (FIG. 21B). In the second step, a second top layer 184 of coating material is provided to add a finished coating to the workpiece which adds durability to the finished coated product. Thus the finished coated workpiece 180 can withstand great forces without sustaining damage to the finished hardened coated workpiece product. The second top layer of coating material is usually thinner than the first anchoring layer of coating material.

The coated workpiece is cured under controlled conditions within an environmental chamber after both the first and the second steps of the coating process. Specifically, the humidity, air temperature and the circulation of air within the chamber is controlled to speed up the curing of the coating material in a controlled manner. This environmentally controlled curing helps to shrink the coating material into the material of the workpiece and thus make the bond between the laminated mesh, the coating material and the workpiece much stronger. It is preferred to place the coated workpiece after both the first and second coating steps into the chamber for 2–4 hours until the coating material is dry. The environmental chamber is kept at about zero air humidity to help speed up the drying process of the coating material. The temperature in the chamber can vary from 70° F. to 100° F. depending on the temperature inside of the manufacturing plant. To provide circulating air fans are provided. Ideally, 2 sets of 4 fans are used in series each set of fans generating 16,000 CFM for each fan. This is found to provide satisfactory air circulation to speed up the curing process.

Figure 22:
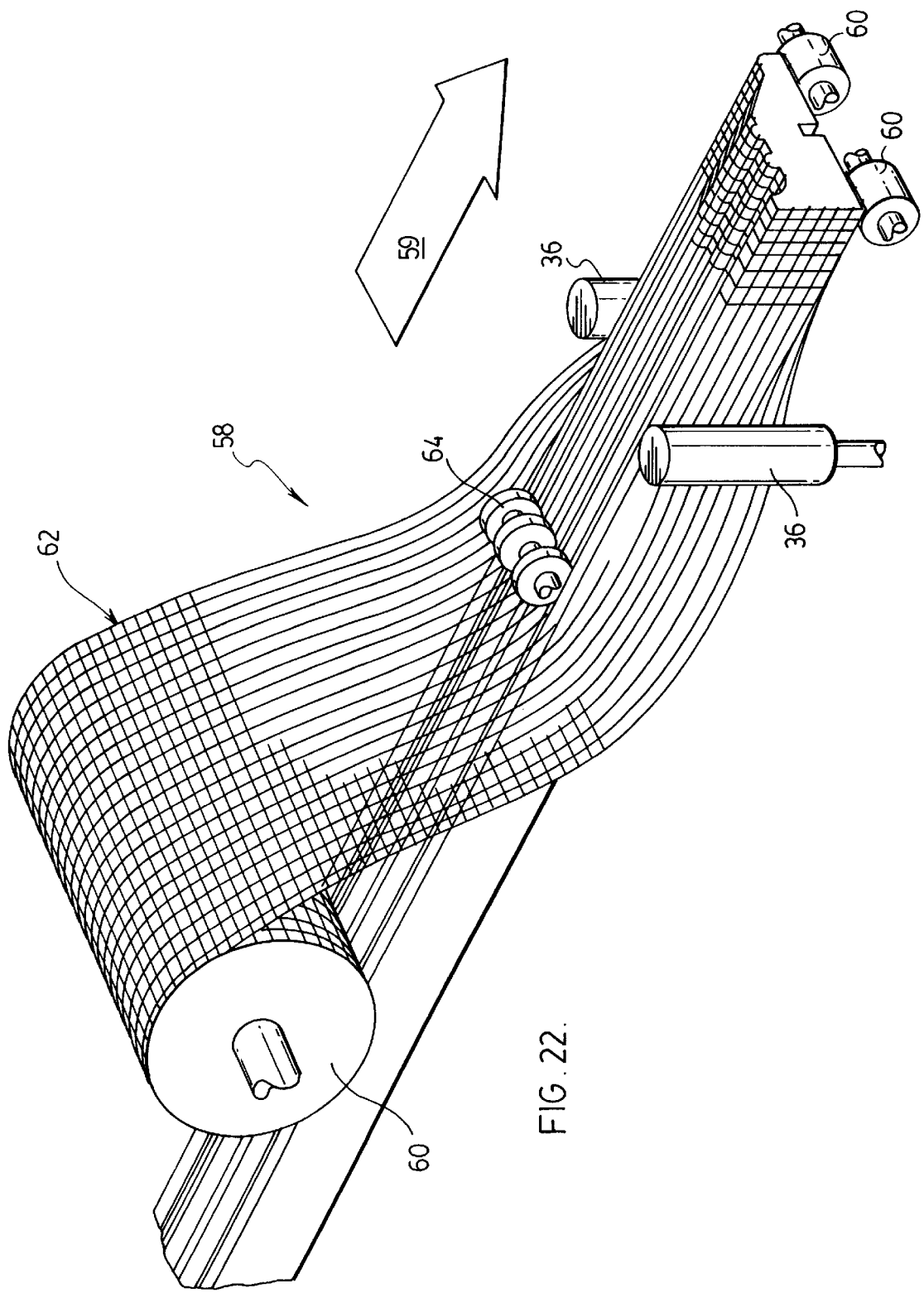
FIG. 22 is a perspective view showing a mesh applying apparatus which can be used with the different apparatus embodiments of the present invention.

The apparatus encompassed by both embodiments of the invention may additionally incorporate a mesh applying station as shown in FIG. 22. A mesh applying station 58 is positioned in advance of the coating chamber. Here, the workpiece is advanced in direction of arrow 59 towards the coating chamber on a set of guide rollers 60. A pair of opposing rotating wheels 36 are also positioned on either side of the workpiece to minimize lateral horizontal movement of the workpiece as it is being advanced through the apparatus. A large mesh roll 62 is supported above the surface of the workpiece and unveils as the workpiece is advanced. A roller 64 configured to mate with the decorative surface is positioned biased against the top of the mesh as it is being applied to the surface of the workpiece to ensure that the tacky side of the mesh adheres completely to the decorative surface. Once covered in mesh, the workpiece is then moved and guided to the coating portion of the apparatus.

In summary, the methods and the apparatus of the present invention provide an improvement over methods and other automated coating machinery of the prior art. Both the present methods and apparatus provide on a consistent basis, an even engineered smooth coating with a controlled thickness to the entire exposed decorative surface of a workpiece. In addition, the method also embodies engineering a controlled thickness of coating material to desired bottom portions of the workpiece. This creates a finished workpiece that has significantly better physical properties than workpieces coated by prior art methods. The finished workpiece is more durable due to the fact that the method actually bonds the coating to the desired surfaces of the workpiece such that the coating shrinks into all of the crevices and intricacies of the exposed surfaces of the workpiece. The finished workpiece is aesthetically pleasing and very durable.

The present invention avoids the problems of having air bubbles, cracks or an uneven thickness of coating material left on the coated workpiece. The method is simple, efficient, cost effective and works consistently in applying a plaster-like coating to the exposed decorative surface of a workpiece such that several workpieces can be coated quickly and efficiently on a commercial scale for use in the construction industry.

Although preferred embodiments have been described herein in detail, it is understood by those skilled in the art that variations may be made thereto without departing from the scope of the invention as defined by the appended claims.

We claim:

1. An apparatus for applying a plaster coating material to exposed surfaces of a preform workpiece having a decorative exposed surface and a bottom portion, said apparatus comprising:
   means for mechanically advancing a workpiece along said apparatus along a straight horizontal axis over a non-continuous surface;
   means for engaging the bottom portion of the workpiece to constrain lateral and vertical movement as the workpiece passes along said apparatus; and
   means for applying a desired thickness of the coating material to a decorative surface of an advancing workpiece.

2. An apparatus as claimed in claim 1, wherein said advancing means comprises an open platform with means supporting a conveyor system therein.

3. An apparatus as claimed in claim 2, wherein said conveyor system comprises a pair of adjacent conveyor belts for supporting and advancing the workpiece through the apparatus.

4. An apparatus as claimed in claim 3, wherein said conveyor belts additionally have a gripping means to help drive the workpiece with minimal lateral movement through the apparatus on said conveyor belts.

5. An apparatus as claimed in claim 4, wherein said gripping means comprises a plurality of spikes protruding from the surface of said conveyor belts, said spikes penetrating into the bottom portion of the workpiece to drive the workpiece with minimal lateral movement through the apparatus.

6. An apparatus as claimed in claim 1, wherein said engaging means comprises a rail extending vertically from said non-continuous surface, said rail engaging with a corresponding channel located within said bottom portion of the workpiece.

7. An apparatus as claimed in claim 1, wherein said apparatus additionally comprises a restraining means for restraining vertical movement of the workpiece as it is being advanced through said apparatus.

8. An apparatus as claimed in claim 7, wherein said restraining means comprises a tension wheel biased against the top surface of the workpiece upstream of said coating means, said tension wheel rotating along the decorative surface of the workpiece as it is advanced through the apparatus.

9. An apparatus as claimed in claim 8, wherein said tension wheel is mounted to one side of the apparatus by a spring loaded arm member.

10. An apparatus as claimed in claim 1, wherein said coating means comprises a coating chamber having an inlet closely conforming to the cross-sectional profile of a workpiece through which the workpiece is advanced, a plurality of conduits entering and opening into the coating chamber through which the plaster coating material is fed from a reservoir such that the coating material infiltrates the irregular decorative exposed surface of the advancing workpiece, and a die opening through which the coated workpiece exists the chamber, said die opening closely conforming to the cross sectional profile of the coated workpiece and wherein the size of the die opening determines the thickness of the coating material allowed to remain on the coated decorative surface of the workpiece.

11. An apparatus as claimed in claim 10, wherein said conduits open into top portions and side portions of the coating chamber, such that coating material is fed onto the entire decorative exposed surface of the workpiece as it is being advanced through the coating chamber.

12. An apparatus as claimed in claim 11, wherein said coating material is fed under pressure.

13. An apparatus as claimed in claim 10, wherein said die opening conforms within approximately 2–4 mm at selected areas of the cross sectional profile of the coated workpiece.

14. An apparatus as claimed in claim 1, wherein said apparatus additionally comprises a means for laminating a mesh to the entire decorative exposed surface and to part of the bottom portion of the workpiece upstream of said coating means.

15. An apparatus as claimed in claim 14, wherein said mesh laminating means comprises;
   a pair of rotating wheels positioned underneath the bottom flat portion of the workpiece to advance the workpiece to the coating means;
   means for applying an adhesive mesh to the workpiece as the workpiece is advancing; and
   means for adhering the mesh to the workpiece.

16. An apparatus as claimed in claim 15, wherein the mesh is dispensed from a mesh roll positioned on the top surface of the workpiece, wherein the advancing of the workpiece unravels mesh from the roll and onto the exposed decorative surface and to part of the bottom portion of the workpiece.

17. An apparatus as claimed in claim 16, wherein a roller is biased against the top of the unrolled mesh on the workpiece downstream the mesh roll, the biased roller applying a downwards force onto the mesh to adhere the unravelled mesh to the decorative exposed surface of the workpiece.

18. An apparatus of claim 1 wherein said coating means for applying a desired thickness of the plaster coating material to a decorative exposed surface of the advancing workpiece is adapted to apply a coating and to the bottom outside edges of the bottom portion of said workpiece.

19. An apparatus as claimed in claim 18, wherein said advancing means comprises an open platform with a first means supporting a first conveyor system in said open platform positioned upstream of said coating means, said open platform also having a second means supporting a second conveyor system in said open platform, said second means positioned downstream of said coating means.

20. An apparatus as claimed in claim 19, wherein said first and second conveyor system each comprise a pair of adjacent conveyor belts having a plurality of spikes protruding from the surface of said conveyor belts, said spikes penetrating into the bottom portion of the workpiece to drive the workpiece through said apparatus.

21. An apparatus as claimed in claim 18, wherein said engaging means comprises a rail extending vertically from said non-continuous surface, said rail engaging with a corresponding channel located within said bottom portion of the workpiece; said rail being positioned along the entire length of said non-continuous surface.

22. An apparatus as claimed in claim 21, wherein said rail has an undercut and said corresponding channel is shaped to fit therein.

23. An apparatus as claimed in claim 22, wherein said rail is a dovetail shaped rail, or a T-shaped rail.

24. An apparatus as claimed in claim 23, wherein said channel is shaped to correspondingly engage with said rail.

25. An apparatus as claimed in claim 18 wherein said coating means comprises a means for defining an edge to apply coating material to a defined bottom outside edges of the bottom portion of said decorative workpiece.

26. An apparatus as claimed in claim 25 wherein said edge means comprises a pair of spaced apart dams slidingly engaged on spaced apart rails located within a trough defining the bottom portion of said coating chamber, wherein said workpiece is advanced through said coating chamber with said bottom edges of said workpiece substantially aligned with outside edges of said dams such that a controlled amount of coating material is provided on the outside bottom edges of the bottom portion of said workpiece as the workpiece exits through the coating chamber.

27. An apparatus as claimed in claim 26, wherein said coating material is fed into said coating chamber under pressure.

28. An apparatus as claimed in claim 18, wherein said coating means has plates defining inlet and said die opening, said plates being interchangeable in said coating means to facilitate application of first and second coatings.

29. An apparatus as claimed in claim 18, wherein a movable receptacle is provided within the non-continuous platform downstream of said coating means to catch any excess coating material.

\* \* \* \* \*

UNITED STATES PATENT AND TRADEMARK OFFICE
CERTIFICATE OF CORRECTION

PATENT NO. : 6,206,965 B1
DATED : March 27, 2001
INVENTOR(S) : Rao et al.

It is certified that error appears in the above-identified patent and that said Letters Patent is hereby corrected as shown below:

Column 3,
Line 8, after "of" insert -- : --.

Column 8,
Line 65, delete "arc" and insert -- are --.

Column 16,
Line 22, delete "exists" and insert -- exits --.

Signed and Sealed this

Twenty-second Day of January, 2002

Attest:

Attesting Officer

JAMES E. ROGAN
*Director of the United States Patent and Trademark Office*